(12) United States Patent
Levy et al.

(10) Patent No.: US 11,363,799 B2
(45) Date of Patent: Jun. 21, 2022

(54) FRESH-SERVE PET FOOD SYSTEM

(71) Applicant: The Full Life Company, Phoenix, AZ (US)

(72) Inventors: William Levy, Phoenix, AZ (US); Scott Eller, Peoria, AZ (US)

(*) Notice: Subject to any disclaimer, the term of this patent is extended or adjusted under 35 U.S.C. 154(b) by 311 days.

(21) Appl. No.: 16/175,145

(22) Filed: Oct. 30, 2018

(65) Prior Publication Data

US 2019/0133076 A1     May 9, 2019

Related U.S. Application Data

(60) Provisional application No. 62/720,992, filed on Aug. 22, 2018, provisional application No. 62/643,004, filed on Mar. 14, 2018, provisional application No. 62/581,811, filed on Nov. 6, 2017.

(51) Int. Cl.
    *A01K 5/02*     (2006.01)

(52) U.S. Cl.
    CPC .......... *A01K 5/0291* (2013.01); *A01K 5/0216* (2013.01); *A01K 5/0275* (2013.01)

(58) Field of Classification Search
    CPC ........... E06B 2001/707; E06B 3/26301; A01K 5/0216; A01K 5/0275; A01K 5/0291
    See application file for complete search history.

(56) References Cited

U.S. PATENT DOCUMENTS

| | | | | |
|---|---|---|---|---|
| 2006/0263501 | A1* | 11/2006 | Oghafua | A47J 27/004 426/523 |
| 2012/0213030 | A1* | 8/2012 | Cheung | B01F 7/00208 366/204 |
| 2015/0035197 | A1* | 2/2015 | Yu | D01D 1/04 264/211 |
| 2015/0056352 | A1* | 2/2015 | Dogan | A47J 31/407 426/431 |
| 2015/0335197 | A1* | 11/2015 | Moon | A47J 31/3633 99/295 |
| 2016/0220058 | A1* | 8/2016 | Rocklinger | A23L 5/13 |
| 2017/0354119 | A1* | 12/2017 | Dewey | A01K 5/0275 |

FOREIGN PATENT DOCUMENTS

DE     202017101324 U1 *   3/2017    ........... A01K 5/0216

* cited by examiner

*Primary Examiner* — Ibrahime A Abraham
*Assistant Examiner* — Dilnessa B Belay
(74) *Attorney, Agent, or Firm* — Frank Marino

(57) ABSTRACT

An apparatus engageable with a container of pet food for preparing the pet food includes a water source, a water pump, and a water heater. The water pump causes a first amount of water to flow to the heater where the first amount is heated and then causes the heated first amount to flow into the pet food whereby the pet food is heated to a first temperature and moistened to a first moistness level. A timer monitors a first steeping period after the first amount has flowed into the pet food, then the water pump causes a second amount of water to flow to the heater. The second amount then flows into the pet food. The second amount is heated such that the pet food obtains a second temperature cooler than the first temperature and moistened to a second moistness level moister than the first moisture level. The timer then monitors a second steeping period after the second amount has flowed into the pet food and then actuates a ready indicator to indicate that the pet food is properly heated and moistened for serving.

11 Claims, 12 Drawing Sheets

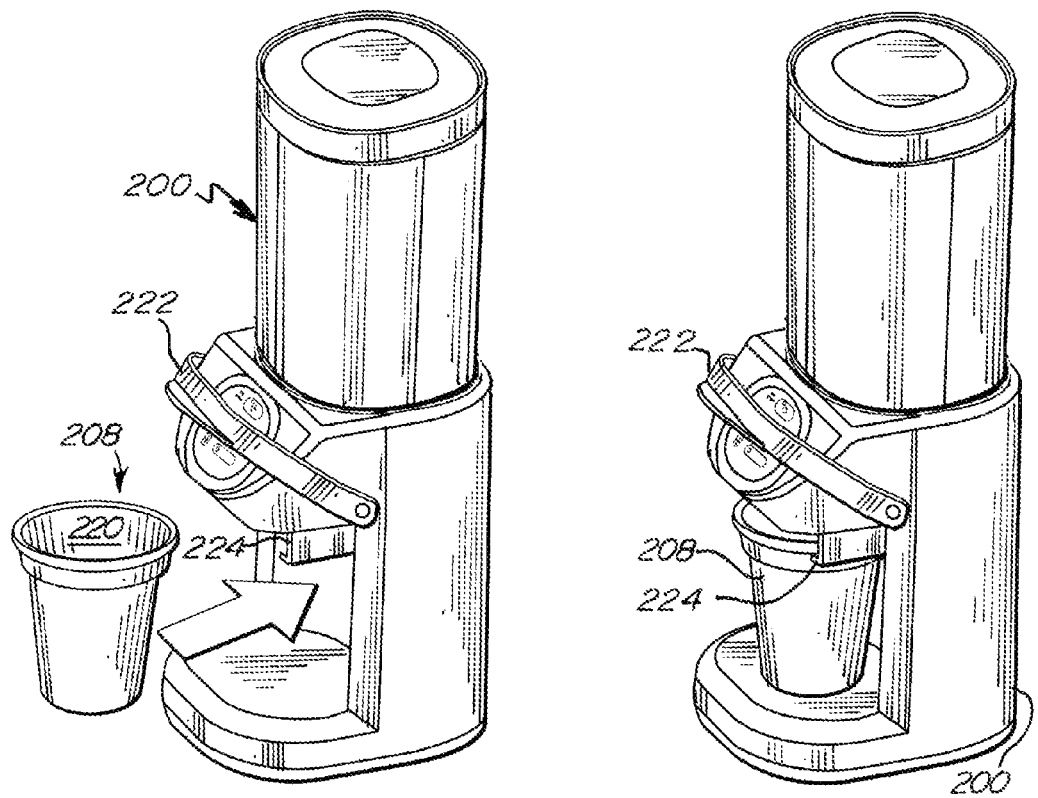
*Fig.15A*
*Fig.15B*
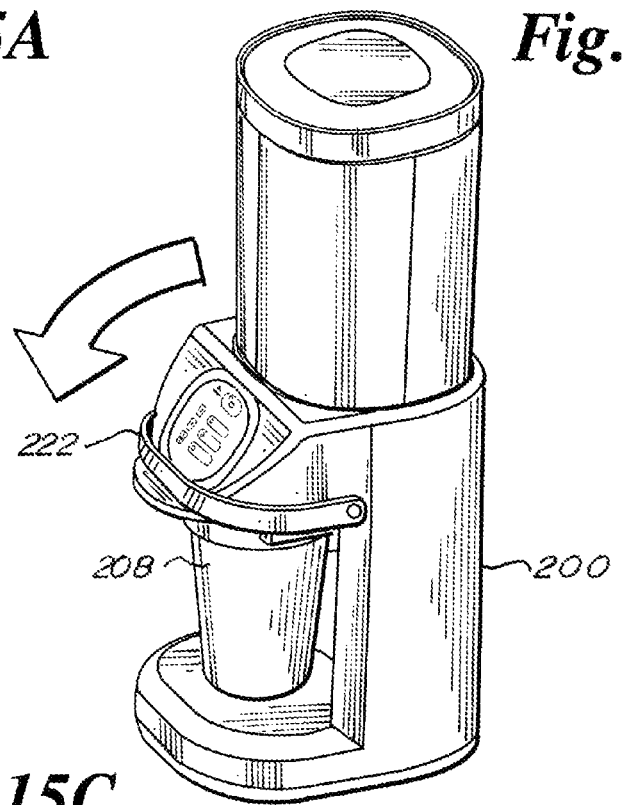
*Fig.15C*

FRESH-SERVE PET FOOD SYSTEM

FIELD

The present invention is related to pet feeding. More specifically, the invention is related to providing warm and moist meals to pets.

BACKGROUND

A common and age-old problem is that pets, especially dogs, love warm moist meals. And we, feeling that our pets are like our children, love to pamper them. Our pets love what we eat, and we love to feed them what they love. Much of that might be because they see us eating moist warm aromatic meals, and they wish to emulate us, but then we serve them dry pebbly things that, while probably healthy enough for them, are nothing like what we are serving ourselves. While we sometimes serve them moist food from cans, it is just not the same as what we are eating, and they know the difference. And fresh food made from wholesome human-quality ingredients is always healthier than whatever is in those cans and bags, and we know the difference. If dogs are truly "man's best friend", then they deserve to be treated as such and to eat the way we do . . . warm moist healthful meals that smell and taste fresh and delicious. And the same applies to cats and other cherished pets.

Efforts have been made to satisfy our desire to pamper our pets with warm meals by the marketing of pet food with instructions to add hot water, stir, and serve. But such products have proven to require too much effort and time, and have therefore failed to take hold in the marketplace. Some pet owners take it upon themselves to add water to dry pet food and warm it in a microwave, or to spoon canned pet food into a bowl and warm it in a microwave, but few pet owners are devoted enough to go to so much effort, and frankly, warmed pet food smells terrible, and accentuates the poor quality of and lack of freshness in its ingredients. Anyone who has smelled canned dog food hot out of the microwave knows how unappealing it is. And anyone who has gone to the trouble of heating their pets' meals on a stove or in a microwave knows that is takes on average fifteen minutes, and that those seem like the longest fifteen minutes of the day, as their pets wait patiently, drooling profusely, nearby.

There is the need, and it may be an objective of the invention, to provide a simple appliance that creates warm moist fresh and healthful meals for pets. There is the additional need, and it may be an additional objective of the invention, to create such warm moist fresh and healthful meals for pets quickly. There is the additional need, and it may be an additional objective of the invention, to provide a simple system for creating such quick warm moist fresh and healthful meals for pets. There is the additional need, and it may be an additional objective of the invention to provide a simple method for creating such quick warm moist fresh and healthful meals for pets. There is the additional need, and it may be an additional objective of the invention, to provide a simple method for creating such quick warm moist fresh and healthful meals for pets using a simple appliance and/or system. Further needs and objectives will become apparent upon perusal of the disclosure herein.

SUMMARY

The herein disclosed exemplary appliance, and equivalents thereto, combines cool or warm water, and sometimes steam, with specially suited pet food to provide a warm moist fresh healthful delicious and aromatic meal for a pet, which emulates the types of meals the pet's master serves himself or herself.

The invention may be embodied by or practiced using an apparatus engageable with a container of pet food for preparing the pet food and comprising a water source, a water pump, and a water heater. The water pump may cause a first amount of water to flow to the heater where the first amount is heated and then causes the heated first amount to flow into the pet food whereby the pet food is heated to a first temperature and moistened to a first moistness level. A timer may provide a first steeping period after the first amount has flowed into the pet food. The water pump may cause a second amount of water to flow to the heater after the first steeping period. The second amount may be heated and the pump may cause the heated second amount to flow to into the pet food whereby the pet food is heated or cooled to a second temperature and moistened to a second moistness level.

The timer may provide second steeping period after the second amount has flowed into the pet food. The apparatus may include a ready indicator, wherein the ready indicator may be activated after the second steeping period to indicate that the pet food is properly heated and moistened for serving. The water source may be a refillable water tank.

The apparatus may include a piercer for piercing the cup to allow access to the food therein. The apparatus may include a user accessible lever for activating the piercer. The piercer may be a spout in communication with the water pump and adapted to both pierce the cup and enable the first and second amounts to flow there-through and into the pet food.

The apparatus may include a controller enabling user input of food container size. The controller may communicate with the water pump to control one or both of the first and second amounts according to the user inputted food container size. The first and second amounts may be variable by the controller according to the inputted food container size. The first temperature may be over approximately 140F. The second temperature may be between approximately 95F and 105F.

The apparatus may alternatively include a piercer, a motor-driven turntable, a food bowl engageable with and removable from the turntable, and a stationary stirrer. Activation of the piercer may cause the food to fall from the food container into the food bowl. The turntable may cause the food bowl to rotate and the stationary stirrer to stir the food in the rotating bowl during the first and second steeping periods. The apparatus may include a ready indicator, wherein the ready indicator may be activated after the second steeping period to indicate that the pet food is properly heated and moistened for serving.

The water source may be a refillable water tank. The apparatus may include a user accessible lever for activating the piercer. The piercer may be a blade adapted to cause a partially annular cut through the food container. The apparatus may include a controller enabling user input of food container size. The controller may communicate with the water pump to control one or both of the first and second amounts according to the user inputted food container size.

The invention may alternatively be embodied by or practiced using a method of preparing a meal for a pet. The method may include adding water of approximately 140F or more to pet food from the group including freeze dried meat, vegetable and grain, dehydrated meat, vegetable and grain, and raw meat, vegetable and grain.

The method may include steeping the food/water mixture for at least 30 seconds. The method may include adding hot water of a lesser than 140F temperature to the steeped mixture of a temperature such that the mixture becomes 95F to 105F. The method may include stirring the steeping food/water mixture. The method may include stirring the less hot water and steeped food/water mixture.

The invention may alternatively be embodied by or practiced using an apparatus engageable with a container of pet food for preparing the pet food and including a water source, a water pump, a water heater, a timer, and an indicator. The water pump may cause a first amount of water to flow to the heater where the first amount is heated to over approximately 140F and then may cause the heated first amount to flow into the pet food whereby the pet food is heated and moistened. The timer may monitor a first steeping period after the first amount has flowed into the pet food. The water pump may cause a second amount of water to flow to the heater and be heated to a second temperature. The second amount may flow into the pet food to cool and further moisten the steeped pet food. The indicator may be actuated to indicate that the pet food is properly heated and moistened for serving. The timer may then monitor a second period after the second amount has flowed into the steeped pet food and before the indicator is actuated. The second temperature may be such that the food properly heated and moistened for serving is 95F to 105F.

Further features of the invention will become apparent upon perusal of the disclosure herein.

BRIEF DESCRIPTION OF THE DRAWINGS

FIGS. 15A through 15C are a series of sequential views of the steps used to make fresh pet food using the system of FIG. 10;

DESCRIPTION OF EXEMPLARY EMBODIMENTS

Figure 1:
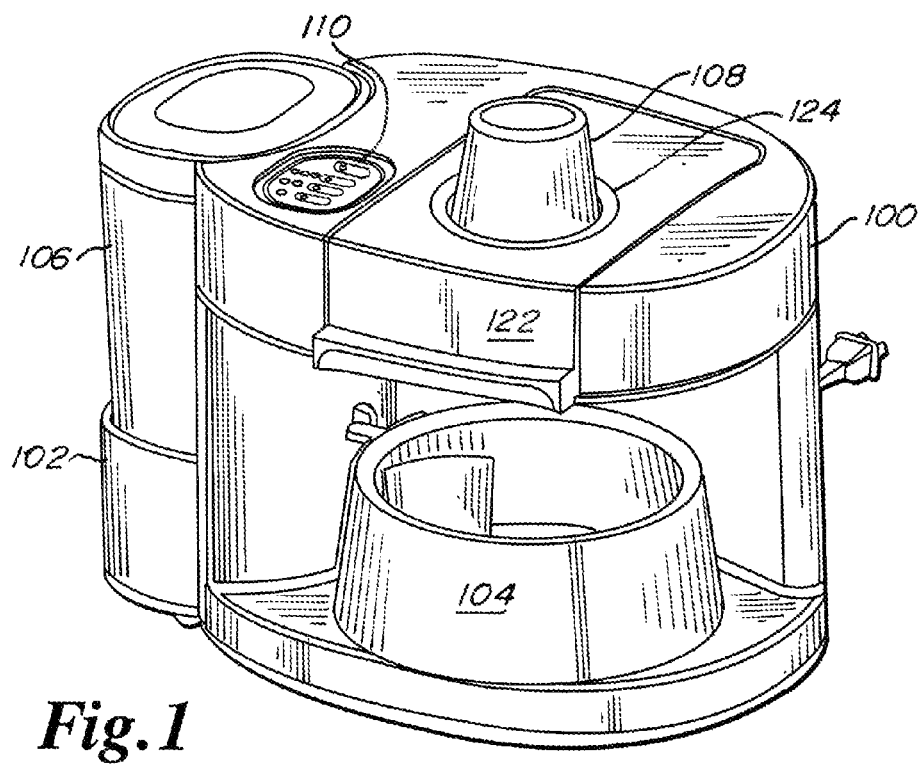
FIG. 1 is a perspective view of a fresh-serve pet food system according to a first exemplary embodiment.

Referring first to FIGS. 1 through 9, a first exemplary fresh-serve pet food maker 100 is shown. The maker has a base 102, a food bowl 104, a stirrer 128 and a water tank 106. The base is adapted to receive the water tank, the food bowl/stirrer and the food cup 108 as explained below and depicted in the figures. The base has a control panel 110 which provides a user interface for operation.

Figure 5:
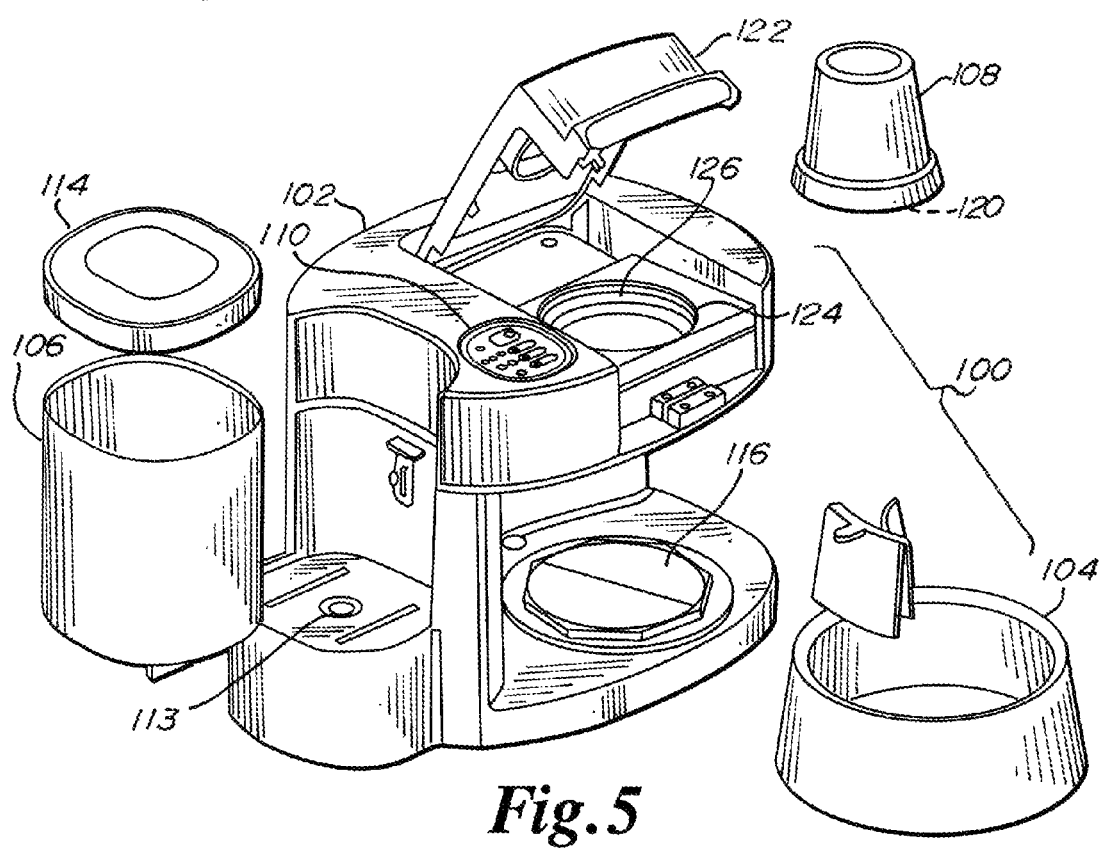
FIG. 5 is an exploded view of the system of FIG. 1.
Figure 2:
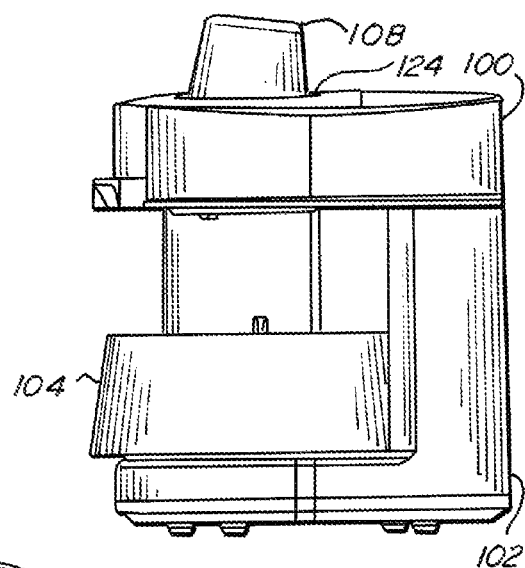
FIG. 2 is a side view of the system of FIG. 1.
Figure 3:
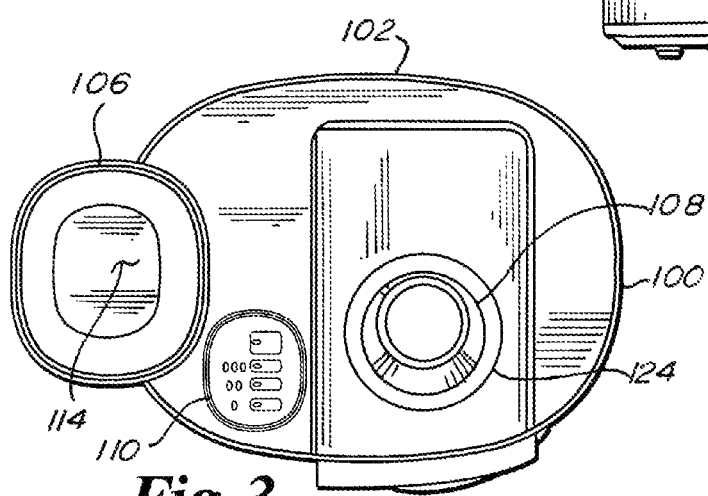
FIG. 3 is a top view of the system of FIG. 1.
Figure 4:
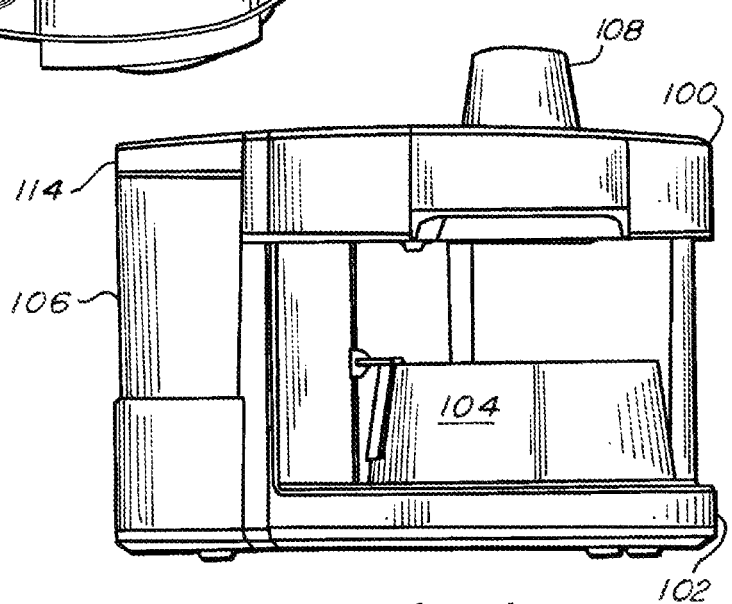
FIG. 4 is a front view of the system of FIG. 1.

Water tank 106 is initially filled with water either by removing the tank from the base and removing the tank's lid 114 as in FIG. 5, filling the tank at a tap, and returning the tank to the base, or by removing the lid and carrying the entire maker to the tap for filling, or by filling with an auxiliary pitcher or such (not shown). Food cup 108 has one of a variety of volumes according to the pet's diet, and is provided filled with loose pet food 118 and sealed with a foil top 120.

The pet food is made of wholesome ingredients, including meats, grains, vegetables, and broths, all free-dried at their peak of freshness and immediately vacuum sealed into the cup. Once re-hydrated, the food is more healthful, fresh, and delicious, than any other pet food in the market. The food may otherwise be some other type, such as dehydrated pet food in need of rehydration or raw pet food in need of cooking.

Figure 6A:
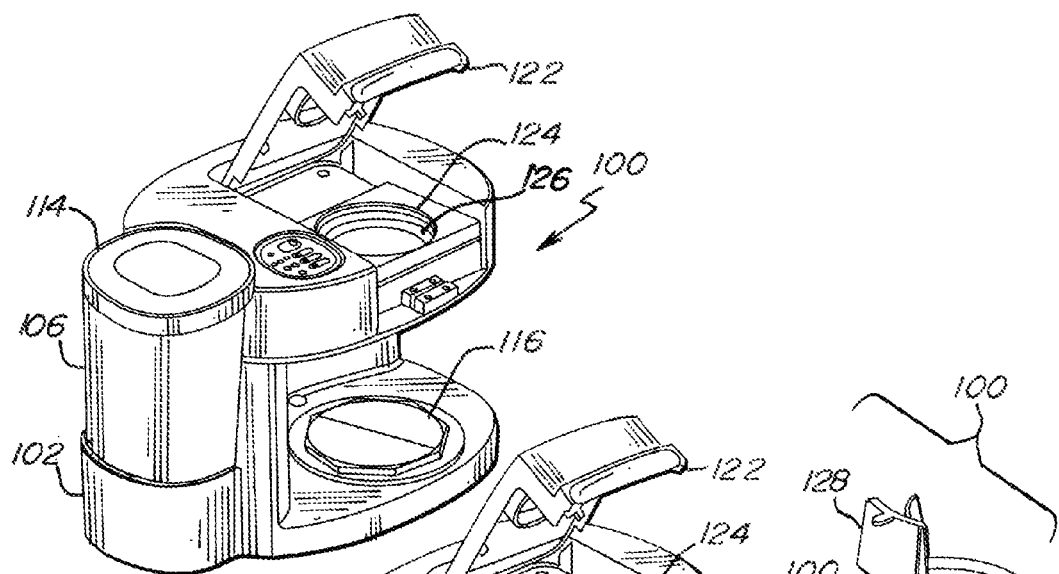
FIGS. 6A through 6E are a series of sequential views of the steps used to make fresh pet food using the system of FIG. 1.
Figure 6B:
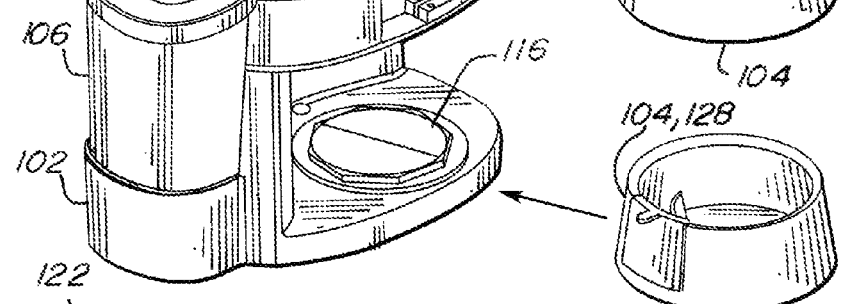
Figure 6C:
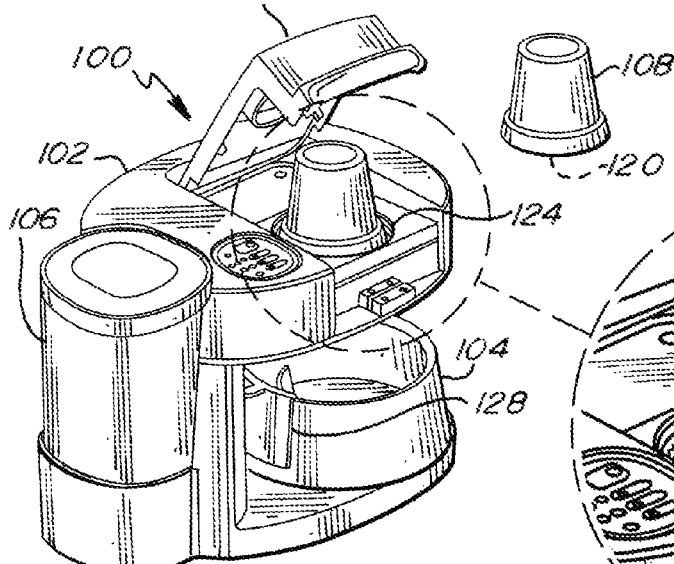
Figure 6C:
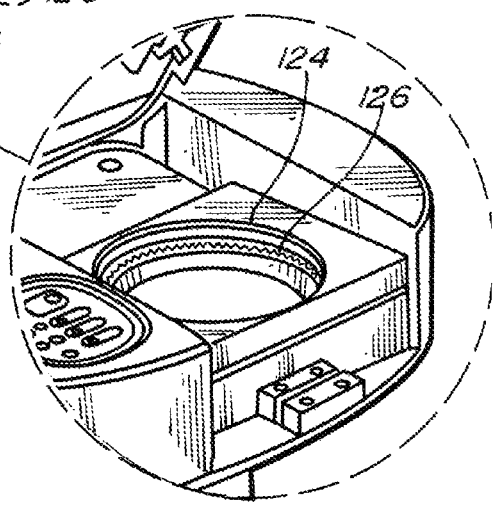
Figure 6D:
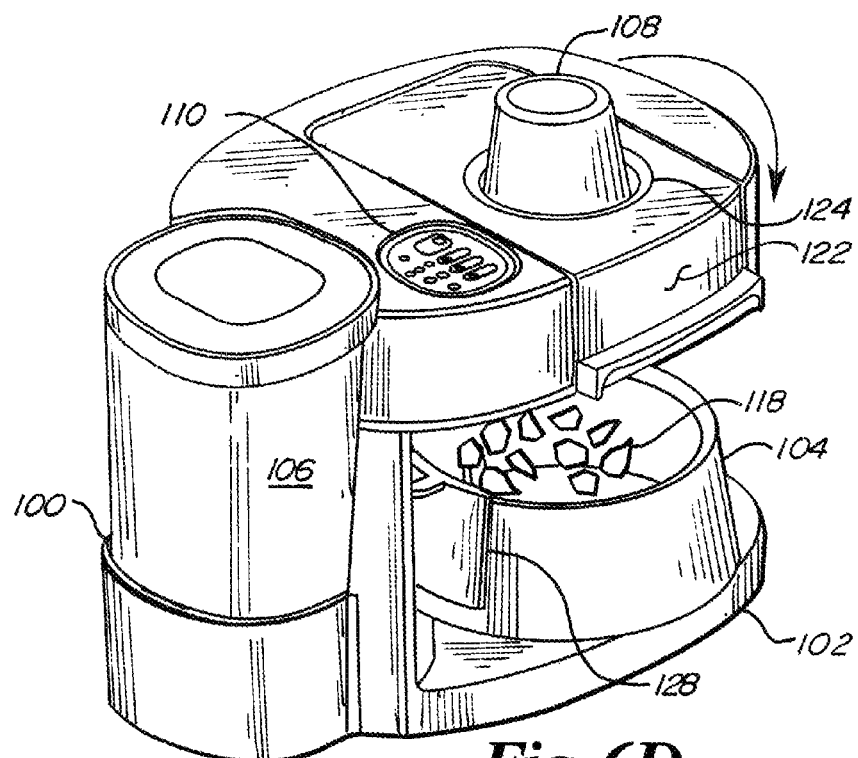

The base's lever 122 is lifted as in FIG. 6A. Stirrer 128 is placed over the peripheral lip of the food bowl and the bowl is then placed on the base's octagonal turn table 116 as in FIG. 6B. The underside of the bowl has an octagonal recess (not shown) which engages the turn table. The cup is then placed top-side-down into bottomless cup receiver 124 so that the cup receiver's annular serrated blade 126 contacts the foil top as in FIG. 6C. As lever 122 is then pushed back down as shown in FIG. 6D, it forces the serrated blade to pierce the foil top, which flaps downwardly open to release the food from the cup. The blade has a gap in its circular edge, which prevents the blade from completely severing the top form the cup, and so the top remains connected to the cup only in the small zone avoided by the gap. This allows the weight of the loose dry pet food to force down and open the top, and allows the food to fall through the open-bottomed cup receiver and into the food bowl, but retains the top attached to the cup for later discarding together . . . and prevents the top form also falling into the bowl where it otherwise could interfere with stirring and be dangerously consumed by the pet. The press plate may be lifted at any subsequent time to retrieve and discard the spent food cup.

The cups are provided in a variety of recipes and volumes so that larger amounts of food may be served to larger pets, or a plurality of smaller cups may be deposited into the bowl.

Figure 6E:
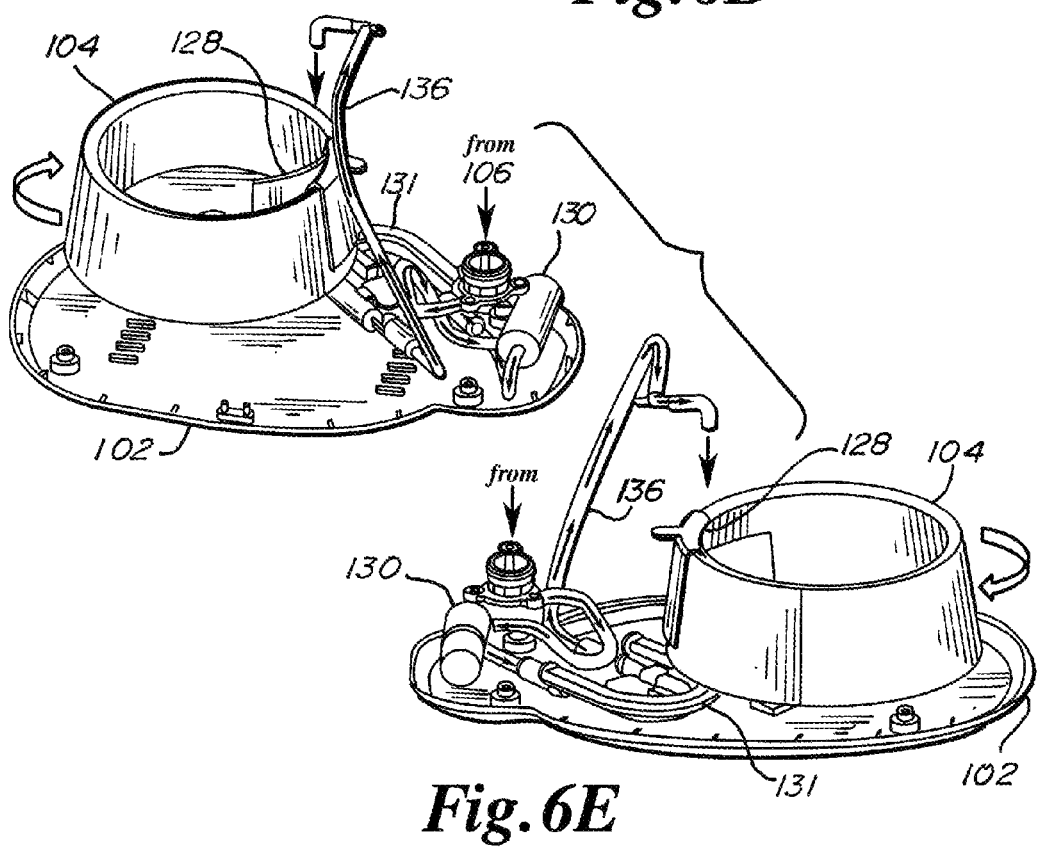

The water tank engages valve 113 when it is properly disposed on the base to allow water to be available to the pump when energized. The unit is then powered on, whereby it will wait in "standby" mode for user input before it proceeds as shown in FIG. 6E and in the flow chart of FIG. 9.

Control panel 110 communicates with water pump 130, heater 131, and turntable motor 132 through a smart controller integral with the control panel. The cup size or quantity being used is next entered by the user so that the controller can determine the amount of water that will be required, and that amount of water is then pumped from tank 106 through energized heater 131 and into the food in bowl 104 through conduit 136 as seen in FIG. 6E. The heater is a tubular heater in series with the conduit and heats the water as it flows therethrough, according to the energy it selectively provides, and without requiring any delay to bring the entire volume of water to temperature. This allows the controller to heat the water to different temperatures as needed. The initial blast is very hot water of a temperature over 140F, which may be in the form of steam, which penetrates the dried food and then steeps for a defined period of time, as determined by timer 139, as the controller waits. This efficiently rehydrates and cooks the food, and kills any undesirable bacteria or germs, such as *salmonella* or *E. coli*. This also brings freeze-dried food back to its pre-freeze-dried consistency and flavor, brings dehydrated food back to its pre-dehydrated consistency and flavor, and cooks raw food.

It should be apparent that, while this exemplary embodiment employs a motorized water pump, numerous equivalent means may otherwise be used to move the water, such as gravity, thermal expansion (as used in common drip coffee makers), a piston, or any other known means, and that as used herein, the term "water pump" is not intended to be limited to only a motorized water pump, but is intended to encompass any such equivalent means.

Figure 7:
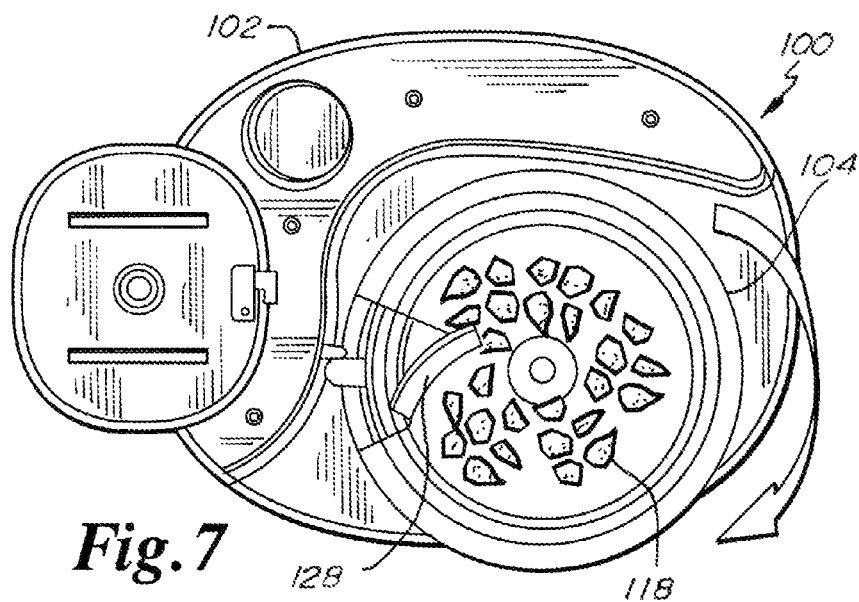
FIG. 7 is a cross-sectional top view of the system of FIG. 1 during stirring.
Figure 8:
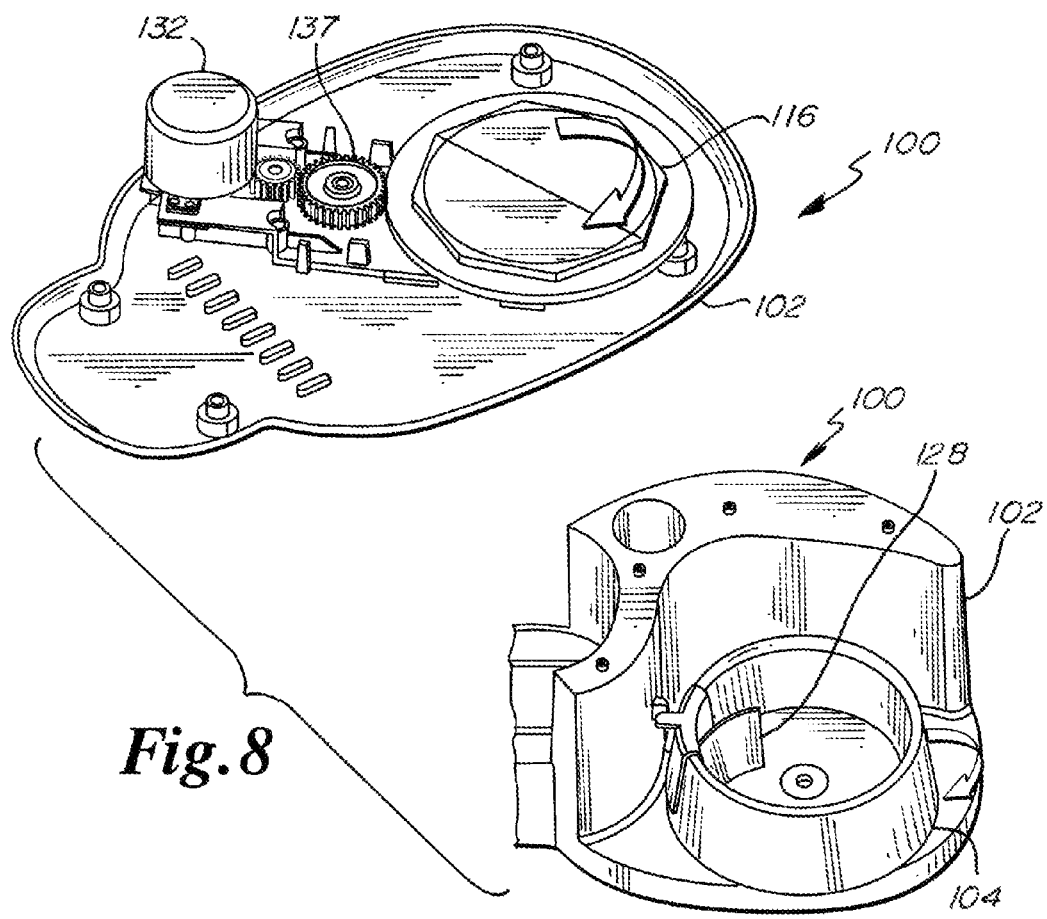
FIG. 8 is a partial perspective view of the stirring mechanism of the system of FIG. 1.
Figure 9:
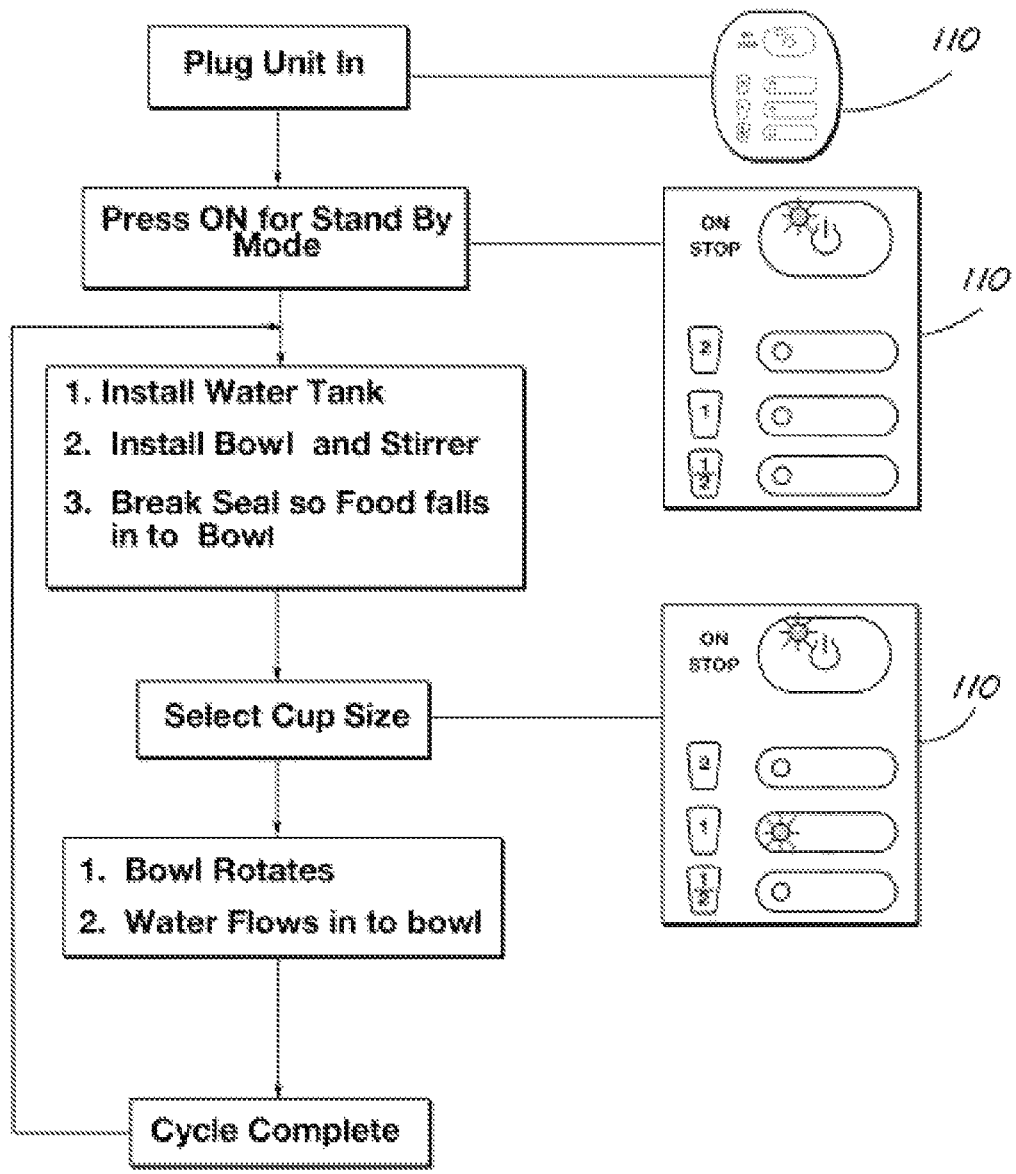
FIG. 9 is a flow diagram of the steps used to make fresh pet food using the system of FIG. 1.
Figure 10:
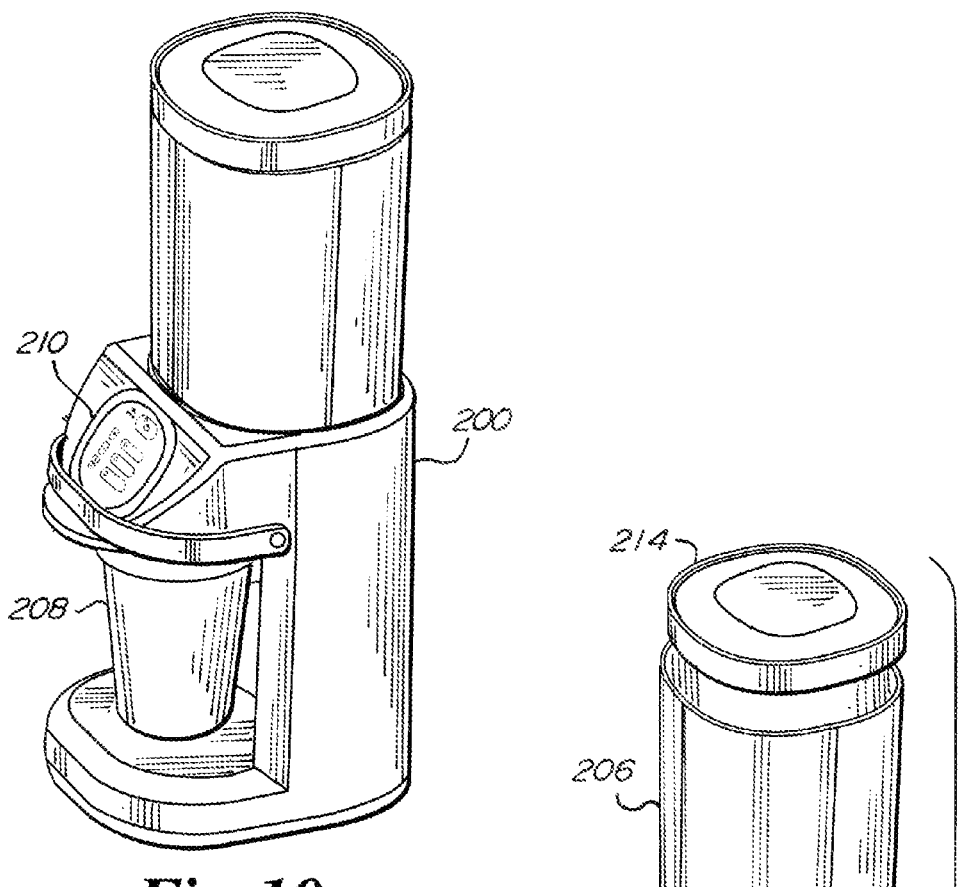
FIG. 10 is a is a perspective view of a fresh-serve pet food system according to a second exemplary embodiment.
Figure 14:
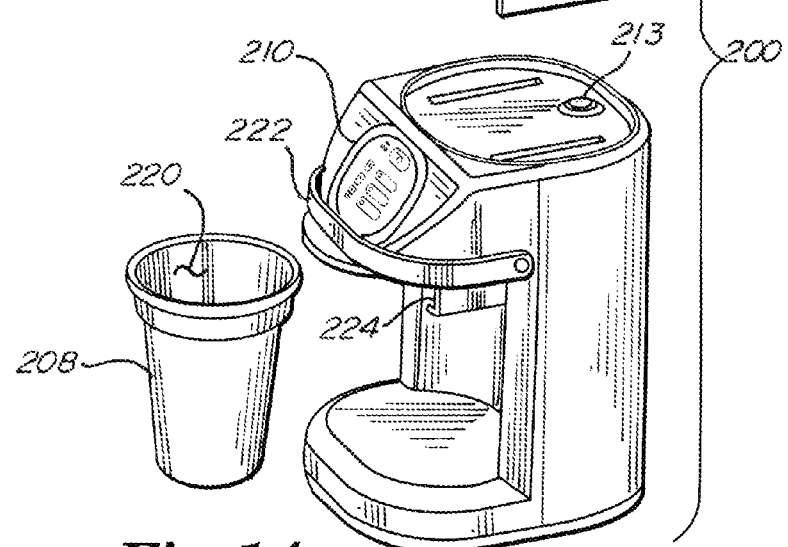
FIG. 14 is an exploded view of the system of FIG. 10.
Figure 12:
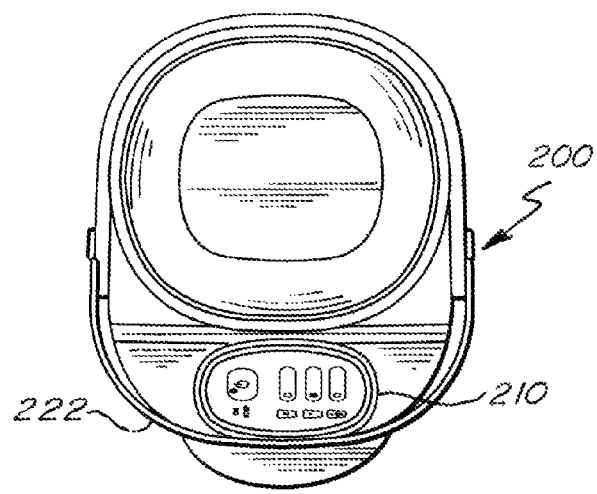
FIG. 12 is a top view of the system of FIG. 10.
Figures 11, 13:
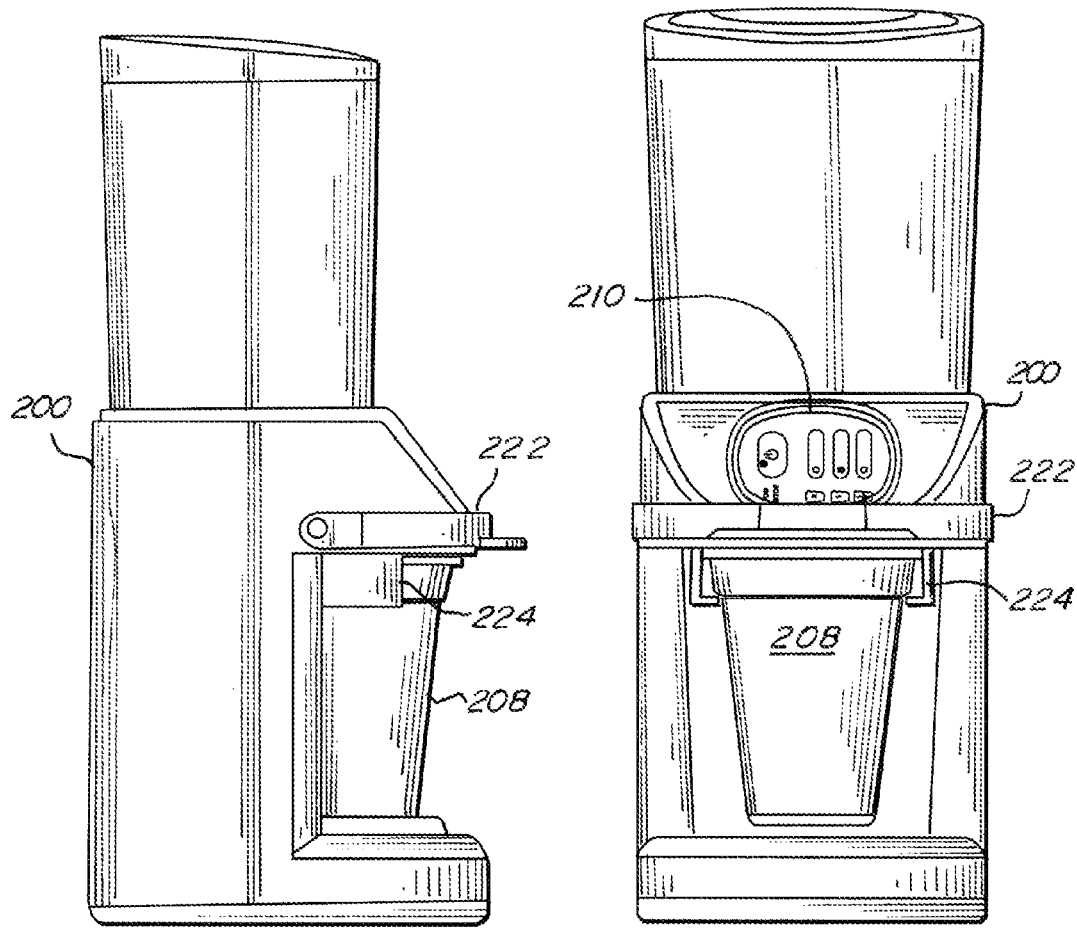
FIG. 11 is a front view of the system of FIG. 10.
FIG. 13 is a side view of the system of FIG. 10.

While adding the steam and during steeping, the controller energizes motor 132 to cause turntable 116 to rotate, by the engagement of gear train 137, to cause a slow rotation of the turntable as shown in FIG. 7. The stirrer 138 comes into engagement with the base as the bowl turns, to become stationary and to thereby stir the food and water together in the rotating bowl as shown in FIG. 8. This fully fully mixes the food and water. The bowl rotates at approximately 4 RPM.

While the bowl continues to turn and stirring thereby continues, the controller again energizes pump 130 and heater 131, but this time sends less energy to the heater and pumps more water into the food. This water is stirred into the rotating food for one more minute to wet the food and create a delicious and gravy, and to give the food a moisture content that is easier to consume and digest.

This second dose of water is heated only to a temperature that, when mixed into the hot food already in the bowl, will cool the food back down to a serving temperature of between 95F and 105F. Studies have shown that dogs and cats, having evolved from predators, prefer to eat food within that temperature range because it mimics the temperature of a "fresh kill". While the initially higher temperature allows the most effective cooking and re-hydration of the food, it is too hot to be served as it would burn the pet's mouth and be otherwise undesirable. And while the cooler second dose of water results in food that is more readily edible, it is not hot enough to sanitize and cook the food. So this two-step moistening technique is uniquely capable of serving pet food that is both properly and safely prepared, as well as deliciously and safely served.

Rotation of the turntable then stops, a "ready" lamp is energized to indicate the cycle is completed, and the food bowl may now be removed and presented to the pet for feeding. The entire preparation, from loading the appliance to serving the prepared food to the pet, requires only three minutes, more or less.

Referring next to FIGS. 10 through 18, a second exemplary fresh-serve pet food maker 200 is shown. The maker has a base 202, a food cup 208, and a water tank 206. In this embodiment, the meal is prepared in the right-side-up food cup and then served from the cup into some other means, such as into a separate food bowl (not shown). The base is adapted to receive the water tank and the food cup as shown. The base has a control panel 210 which provides a user interface for operation.

The lid 214 is removed ant the water tank 206 is filled with water similarly to the first embodiment. The water tank engages valve 213 as it is placed on the base, to allow water to be available to the pump when energized.

Food cup 208, which may be the same as the food cup of the first embodiment, has one of a variety of volumes according to the pet's diet, and contains the food as earlier described. Also as earlier described, the food is sealed in the cup by a foil top 220.

Figures 16, 17:
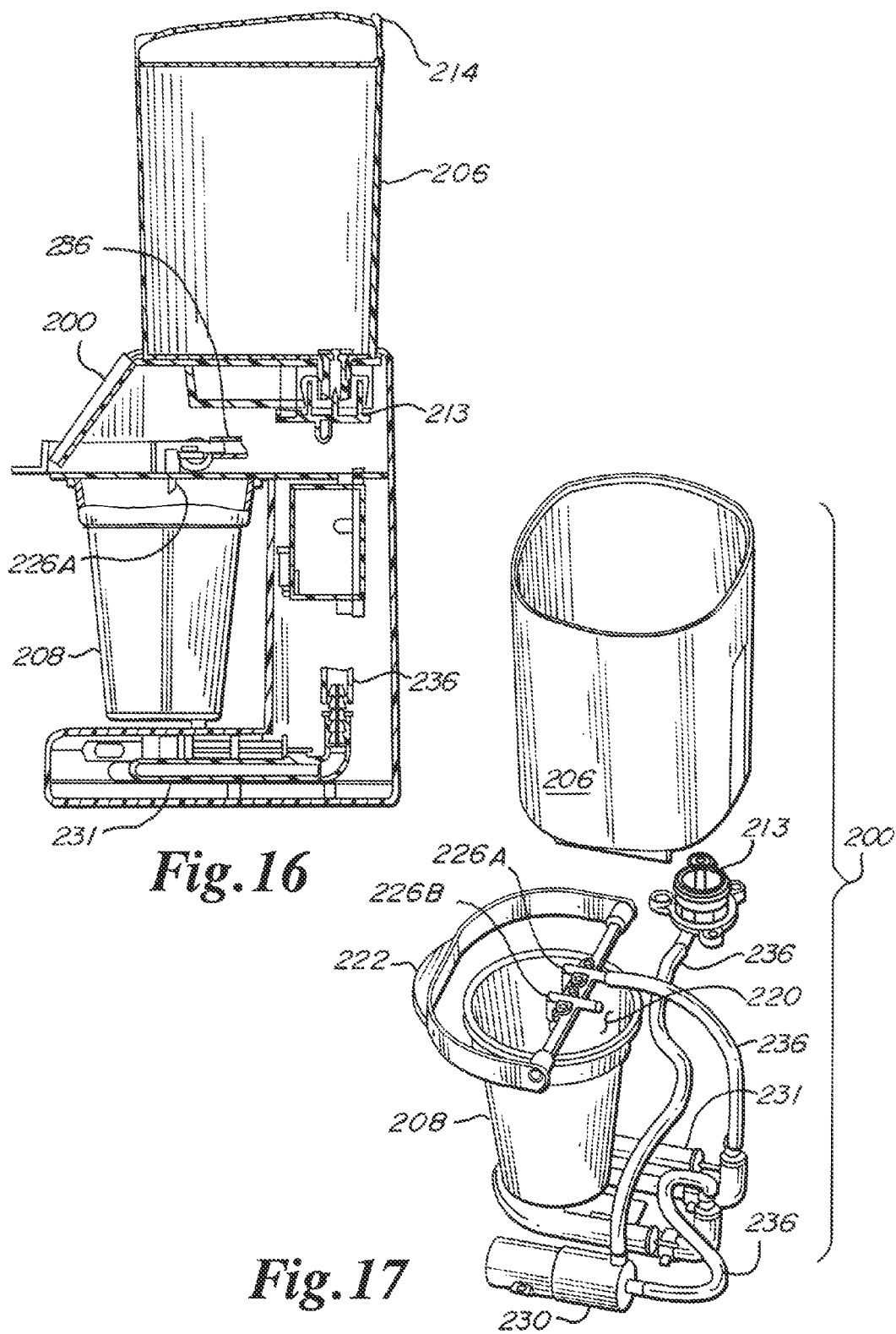
FIG. 16 is a cross-sectional side view of the system of FIG. 10.
FIG. 17 is a partial exploded view of the system of FIG. 10.
Figure 18:
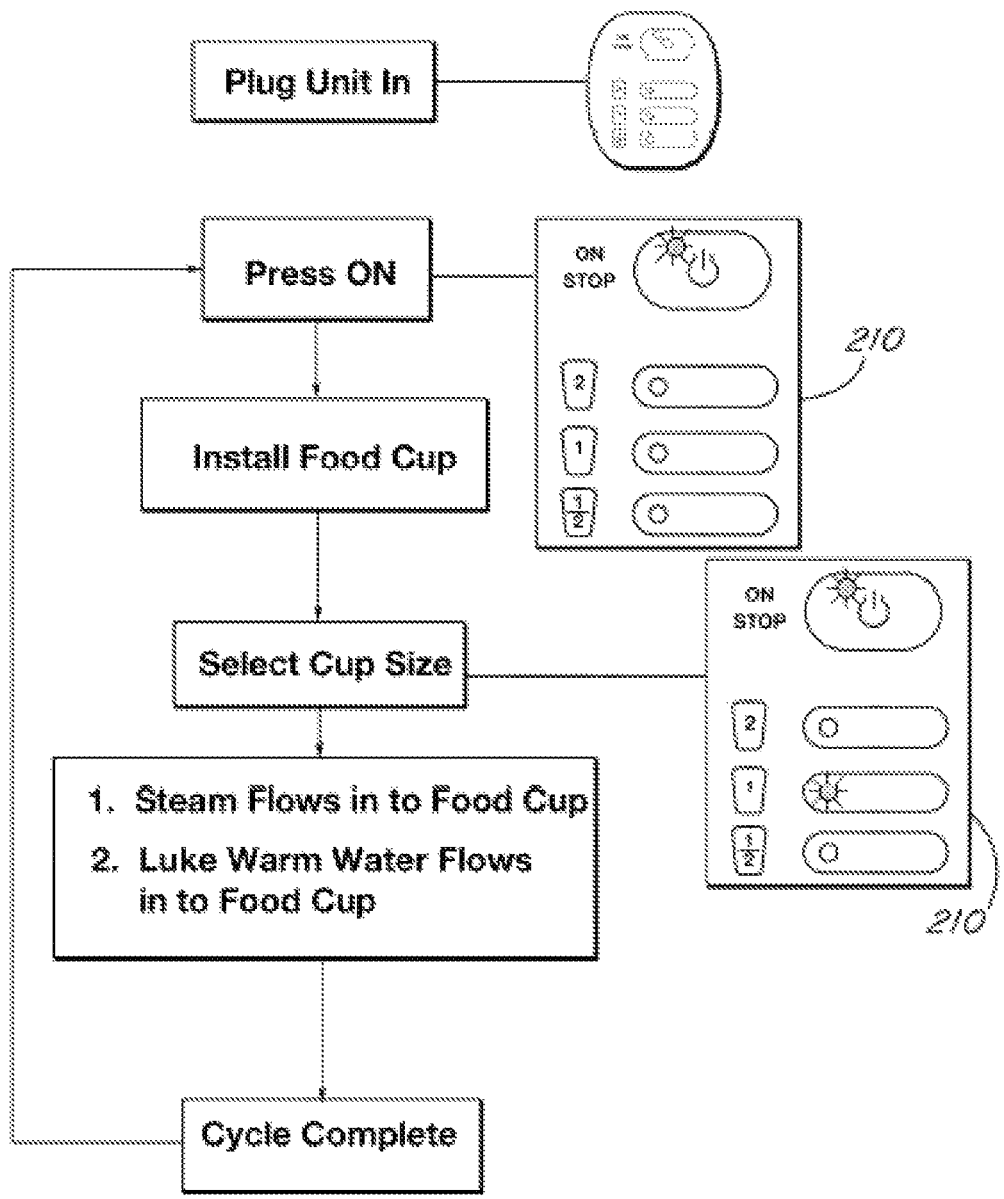
FIG. 18 is a flow diagram of the steps used to make fresh pet food using the system of FIG. 10.
Figure 19:
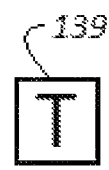
FIG. 19 is a schematic representation of the timer of the system of FIG. 1.
Figure 20:
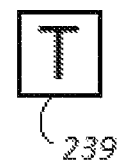
FIG. 20 is a schematic representation of the timer of the system of FIG. 10.

The base's lever 222 is lifted as in FIG. 15A. The cup is then slid top-side-up into cup receiving slot 224 as in FIG. 15B. As lever 222 is then pushed back down as shown in FIG. 15C, it forces the lever's piercing spouts 226A and 226B (which are best seen in FIG. 17) through the foil top.

The unit is then powered on, whereby it will wait in "standby" mode for user input before it proceeds. Control panel 210 communicates with water pump 230 and heater 231 through a smart controller integral with the control panel.

The cup size is next selected by the user so that the controller can determine the amount of water that will be required. Some water is next pumped from tank 206 through valve 213 and conduit 236, and into heater 231, where it is heated at high energy into steam (or water having a temperature over 140F). The steam flows into cup 208 through intake spout 226A to moisten and/or cook the food therein through spout 226A. Vent spout 226B allows air to escape the cup in proportion the volume of steam taken in.

After a one minute pause time by timer 239, which could be adjustable to a different time period as short as 30 seconds according to other factors such as food type, to allow the steam to fully penetrate, re-hydrate, and/or cook the food, the controller causes more water to be pumped into through heater 231, where it is heated with less energy, and into cup 208 to fully wet the food therein for serving. Again, as in the first embodiment, the second dose of water is only heated to a temperature that will result in a final food temperature of between 95F and 105F. The controller pauses for another minute before a "ready" lamp is energized to indicate the water has had sufficient time to consistently moisten all of the food, and that the cycle is now completed and the food is ready for serving. The lever is then lifted and the food cup may now be removed, it's foil top peeled off, and its contents poured into a pet food bowl or such and presented to the pet for feeding. Again, the entire cycle from loading the appliance to serving the food only requires three minutes, more or less.

While the forgoing provides exemplary embodiments are meant to demonstrate key aspects and advantages of the invention, it should be understood that the invention is not meant to be limited thereto. The invention should be limited only by the following claims, including all equivalents thereto.

We claim:

1. An apparatus engageable with a container of pet food insertable there-into for preparing the pet food and comprising a base for supporting the container of pet food, a water reservoir supported on and removable from the base for remote filling, a water pump disposed within the base, a timer, a water heater, a control panel for enabling user control of the apparatus, a pair of container receiving slots, a piercer for piercing the container to allow access to the food therein; and a user accessible lever for activating the piercer; wherein the water pump causes a first amount of water to flow from the reservoir to the water heater where the first amount is heated to at least 140F and then causes the heated first amount to flow into the container of pet food whereby the pet food is heated to a first temperature and moistened to a first moistness level;

the timer provides a first steeping period of at least 30 seconds after the first amount has flowed into the pet food; and the water pump causes a second amount of water to flow from the reservoir to the water heater after the first steeping period, whereby the second amount is heated to 95F to 105F and then causes the heated second amount to flow to into the container of pet food whereby the pet food is cooled to a second temperature and moistened to a second moistness level which is moister than the first moistness level; and wherein the lever has an up and a down position, the pair of container receiving slots comprise one of channels, grooves, and rails within the base adapted to engage a top portion of the container; and during the down position the piercer and the pair of container receiving slots cooperate to deny insertion of the container into the apparatus;

during the up position, the lever interferes with full user access to the control panel; and when the lever has been lifted and the container has been inserted, the lever is adapted so that movement back to its down position will both pierce the container and allow full user access to the control panel.

2. The apparatus of claim 1 wherein the timer further provides a second steeping period after the second amount has flowed into the container of pet food.

3. The apparatus of claim 2 further comprising a ready indicator, wherein the ready indicator is activated after the second steeping period to indicate that the pet food is heated and moistened for serving.

4. The apparatus of claim 3 wherein the water reservoir is a refillable water tank.

5. The apparatus of claim 4 wherein the piercer is a spout in communication with the water pump and adapted to both pierce the container and enable the first and second amounts of water to flow there-through and into the pet food.

6. The apparatus of claim 5 further comprising a controller enabling user input of a food container size.

7. The apparatus of claim 6 wherein the controller communicates with the water pump to control one or both of the first and second amounts according to the user inputted food container size.

8. The apparatus of claim 7 wherein the first and second amounts are variable by the controller according to the inputted food container size.

9. An apparatus engageable with a container of pet food insertable there-into for preparing the pet food comprising a base for supporting the container of pet food, a water reservoir supported on and removable from the base for remote filling, a water pump disposed within the base, a water heater, a timer, an indicator, a control panel for enabling user control of the apparatus, a pair of container receiving slots, a piercer for piercing the container to allow access to the food therein; and a user accessible lever for activating the piercer; wherein the water pump causes a first amount of water to flow from the reservoir to the water heater where the first amount is heated to at least 140F and then causes the heated first amount to flow into the container of pet food whereby the pet food is heated and moistened; the timer monitors a first steeping period of at least 30 seconds after the first amount has flowed into the pet food; the water pump causes a second amount of water to flow from the reservoir to the water heater and be heated to a second temperature; the second amount flows into the container of pet food to cool and further moisten the steeped pet food; the indicator is actuated to indicate that the pet food is heated and moistened for serving; and wherein the lever has an up and a down position, the pair of container receiving slots comprise one of channels, grooves, and rails within the base adapted to engage a top portion of the container; and during the down position the piercer and the pair of container receiving slots cooperate to deny insertion of the container into the apparatus; during the up position, the lever interferes with full user access to the control panel; and when the lever has been lifted and the container has been inserted, the lever is adapted so that movement back to its down position will both pierce the container and allow full user access to the control panel.

10. The apparatus of claim 9 wherein the second temperature is such that the food heated and moistened for serving is 95F to 105F.

11. The apparatus of claim 10 where the timer then monitors a second period after the second amount has flowed into the steeped pet food and before the indicator is actuated.

* * * * *